US006793999B2

(12) United States Patent
Wittmeyer, Jr.

(10) Patent No.: US 6,793,999 B2
(45) Date of Patent: Sep. 21, 2004

(54) CUSTOMIZABLE DECAL AND KIT FOR MAKING THE SAME

(75) Inventor: Larry E. Wittmeyer, Jr., Blue Springs, MO (US)

(73) Assignee: Cardinal Brands, Inc., Lawrence, KS (US)

( * ) Notice: Subject to any disclaimer, the term of this patent is extended or adjusted under 35 U.S.C. 154(b) by 7 days.

(21) Appl. No.: 10/075,790

(22) Filed: Feb. 14, 2002

(65) Prior Publication Data

US 2003/0152733 A1 Aug. 14, 2003

(51) Int. Cl.[7] .................................................. B32B 9/00

(52) U.S. Cl. ....................... 428/40.1; 283/81; 428/40.2; 428/40.4; 428/40.9; 428/41.3; 428/41.5; 428/41.7; 428/41.8; 428/42.1; 428/143; 428/201; 428/202; 428/914

(58) Field of Search .............................. 428/40.1, 40.2, 428/40.4, 40.9, 41.3, 41.5, 41.7, 41.8, 42.1, 143, 201, 202, 914; 283/81

(56) References Cited

U.S. PATENT DOCUMENTS 4,522,864 A 6/1985 Humason et al.
5,817,385 A 10/1998 Stanislav
5,958,560 A 9/1999 Ewan
5,962,110 A 10/1999 Penke-Wevelhoff
6,042,881 A 3/2000 Ewan
6,074,721 A 6/2000 Moore et al.
6,123,890 A * 9/2000 Mazurek ..................... 264/293
6,264,786 B1 * 7/2001 Cromett ...................... 156/289
6,299,967 B1 * 10/2001 Collins ....................... 428/211

OTHER PUBLICATIONS

International Paper Company, Invent IT! Body Sticker Tattoo, 2001, USA.

* cited by examiner

*Primary Examiner*—Nasser Ahmad
(74) *Attorney, Agent, or Firm*—Stinson Morrison Hecker LLP

(57) ABSTRACT

The present invention is directed to a decal wherein the user can print the decal image onto the decal using a computer printer. The decal is preferably supplied to the end user as a kit, wherein the kit comprises a base section onto which the decal image may be printed, and an adhesive section, which provides the adhesive to affix the base section to the substrate after the design has been printed onto the base section. The decal of the present invention does not require a paper layer in the finished decal product, which allows the decal of the present invention to be very thin. In one preferred embodiment, the decal has a thickness of less than about $1.5 \times 10^{-3}$ inches.

25 Claims, 2 Drawing Sheets

CUSTOMIZABLE DECAL AND KIT FOR MAKING THE SAME

BACKGROUND OF THE INVENTION

1. Field of the Invention

The present invention is generally directed to the field of decals, more specifically to decals and a kit for making such decals, wherein the decals are suitable for use on a variety of substrates and a design can be applied to the decals using a computer printer.

2. Description of Related Art

It is well known to decorate various types of items, from drinking glasses to stationery binders, with team logos, advertisements and other types of messages. Most such messages are either pre-printed on the item during the manufacturing process, applied to the item as a pre-printed sticker or handwritten on the item. One popular type of sticker comprises a piece of paper having a printed image on one surface, and a pressure sensitive adhesive on the other surface, wherein the adhesive is used to affix the paper to the item. Such stickers generally are mass produced and are sold in sheets bearing multiple stickers. Although many types of stickers are available, the user is limited to the designs that he or she can find in the marketplace. Further, the user often must purchase several copies of the desired sticker design or must purchase additional stickers, with different designs, in order to purchase the design of interest.

In addition to adorning items with messages or designs, people of many cultures adorn themselves with tattoos to express their identity, religion, courage, patriotism, defiance of death, and emotions. However, many people who would like to express themselves through self-adornment are deterred by the pain, permanence and potential infection and disease that can result from permanent tattoos.

Due to the disadvantages of permanent tattoos, several types of temporary tattoos have been developed. Most such tattoos are designed for mass production, such as by screen printing or high speed lithography. One type of temporary tattoo is created by screen printing an image onto a thin transparent polymeric cover sheet, and applying an adhesive over the image, which adhesive is used to affix the tattoo to the skin. Although such tattoos appear somewhat like a permanent tattoo, the screen print process often results in a thick image that puckers, distorts and cracks when the user's skin wrinkles.

To avoid the problems with screen printing, it is known to print images onto tattoos using offset or lithographic printing. Humanson, et al., U.S. Pat. No. 4,522,864 disclose a process for making a decal using offset lithographic printing that enables rapid manufacture of the decal. In the decal of Humanson, et al., one side of a porous backing paper is coated with a water-soluble slip layer. A thin film of a water-resistant material is applied to the water-soluble slip layer and the design is applied to the water-resistant material using offset lithographic printing. A pressure sensitive adhesive is applied over the ink, which is used to affix the decal to the skin. The offset lithographic printing process used to produce such tattoos is designed for mass production of sheets of tattoos.

Similarly, Moore, et al., U.S. Pat. No. 6,074,721, disclose mass production of decals, wherein the design is applied directly to the water soluble slip layer, which slip layer coats a porous backing paper, and a clear spot coating is applied between the ink and the pressure sensitive adhesive to prevent the surface of the decal from becoming sticky to the touch. Again, such a decal is designed to be mass produced in a factory using a high speed lithographic press.

BRIEF SUMMARY OF THE INVENTION

The present invention is directed to a decal wherein the user can print the decal image onto the decal using a computer printer. The decal is preferably supplied to the end user as a kit, wherein the kit comprises a base section onto which the decal image may be printed, and an adhesive section, which provides the adhesive to affix the base section to the substrate after the design has been printed onto the base section. The decal of the present invention does not require a paper layer in the finished decal product, which allows the decal of the present invention to be very thin. In one preferred embodiment, the decal has a thickness of less than about $1.5\times10^{-3}$ inches.

The base section of the decal kit comprises a base sheet, coated with a release compound, which is covered by an ink jet coating. The ink jet coating enables the user to imprint the decal image onto the base section using a personal computer printer. In addition, the ink jet coating of the present invention binds the ink of the decal image within the ink jet coating and is suitable for use with a wide variety of inks and dyes. Because the ink jet coating binds the ink within the coating, little or no ink is released onto the substrate after the decal is applied to the substrate.

Thus, the decal of the present invention can be used on a wide variety of substrates, with a wide variety of inks and dyes, without harming the substrate. For example, if the decal is intended for use as a temporary tattoo, the decal image can be printed using inks that are not approved by the FDA because the inks will be bound within the ink jet coating and will not contact the user's skin. The ink jet coating of the present invention may be any material that will bind the ink within the ink jet coating, preferably a material selected from the group consisting of polyurethane, vinyl acetate, polyvinyl pyrrolidone (PVP) and polyvinyl alcohol (PVOH).

In a preferred embodiment, the base section of the decal additionally comprises a layer of a water-resistant compound between the release compound and the ink jet coating layer. The water-resistant compound is preferably a non-solvent-based polymer, most preferably a urethane. The water-resistant compound protects the ink jet coating and ink, both during application of the decal to the substrate and once the decal has been applied to the substrate. In the preferred embodiment wherein the water-resistant compound is not solvent based, it does not set quickly, and it therefore can be applied to the base sheet using a wide variety of manufacturing techniques.

In an alternative embodiment, the decal may also comprise a layer of finish between the release compound and the water-resistant compound. The finish layer alters the appearance of the decal. Preferably the finish is varnish that gives the decal a matte finish. The finish may be transparent, opaque, colored and/or contain glitter to alter the appearance of the decal image.

The adhesive section of the decal kit of the present invention supplies an adhesive to bind the base section of the decal to the substrate. The adhesive section comprises an adhesive layer, sandwiched between first and second backing sheets. The backing sheets are preferably comprised of a dry release paper that can be easily separated from the adhesive layer.

To assemble the decal of the present invention from the decal kit of the present invention, the user feeds the base section into a computer printer, such that the printer will print the desired decal image onto the surface of the base section bearing the ink jet coating. The user then removes a first backing sheet from the adhesive layer and affixes the exposed surface of the adhesive layer to the ink jet coating of the base section. The user then removes the second backing sheet and applies the exposed surface of the adhesive layer, opposite the surface applied to the base section, to the substrate.

After affixing the base section to the substrate, the user removes the base sheet to reveal the decal image. In a preferred embodiment the release compound is a dry release compound, such as silicone, which will produce low amount of adhesion with the water-resistant compound. As a result, the adhesive layer, which creates a high level of adhesion between base section and the substrate, will hold the decal to the substrate, allowing the base sheet bearing the release compound to simply be pulled away from the water-resistant compound. In an alternate embodiment, the release compound is a water-soluble compound and the base sheet is a porous paper. To remove the base sheet in such embodiment, the user applies water to the porous paper, which penetrates and dissolves the water-soluble compound, allowing the user to remove the porous paper base sheet.

In use, the adhesive layer, positioned between the ink jet coating and the substrate, aids in preventing the ink of the decal image from coming into contact with the substrate. In one embodiment, the adhesive layer comprises a barrier layer sandwiched between first and second adhesive sub-layers. The first adhesive sub-layer binds the barrier layer to the ink jet coating, and the second adhesive sub-layer binds the barrier layer to the substrate. The barrier layer adds still further protection against the ink of the decal image reaching the substrate. In addition, when the substrate is human skin, the barrier layer blocks perspiration from the skin from coming into to contact with and smudging the ink of the decal image.

The decal kit of the present invention may optionally contain ink to be used to print the decal image. However, insofar as any ink or dye suitable for use in the user's printer may be used to print the decal image in the decal of the present invention, the ink may be obtained by the user separately from the kit. It is an advantage of the present invention that the end-user can use many inks and dyes, including ink obtained for other purposes, to print the decal image onto the decal of the present invention, regardless of the substrate onto which the decal will be applied. The decal kit may also contain additional layers or decorations to apply to the decal.

The decal of the present invention can be produced from the decal kit of the present invention, using a home computer and printer, which provides the user with a nearly unlimited number of decal images from which to choose. Further, because the ink jet coating binds the ink within the ink jet coating, the user can use a wide variety of inks to produce the decal image. Thus, the decal kit of the present invention enables the user to produce conveniently a wide variety of decals. Further, in one embodiment of the present invention, the decal is comprised only of an ink jet coating layer, in which ink is embedded, and an adhesive layer. Such a decal is much thinner than a decal comprising paper, or a similarly thick layer. Even in the embodiment comprising adhesive, ink jet coating, ink, a water-resistant compound and a finish, the total thickness of the decal is less than $1.5\times10^{-3}$ inch, exclusive of the base sheet and backing sheets. The thin decal of the present invention produces a decal that, when affixed to a substrate, appears to be printed or tattooed on the substrate, producing a professional and finished appearance that is difficult, if not impossible, to achieve with decals comprising a paper layer.

DETAILED DESCRIPTION OF PREFERRED EMBODIMENT

Figure 1:
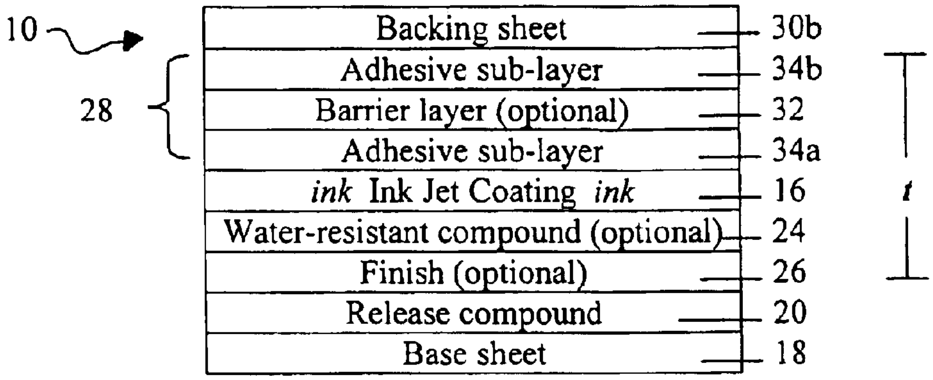
FIG. 1 depicts the assembled decal of the present invention.
Figure 2A:
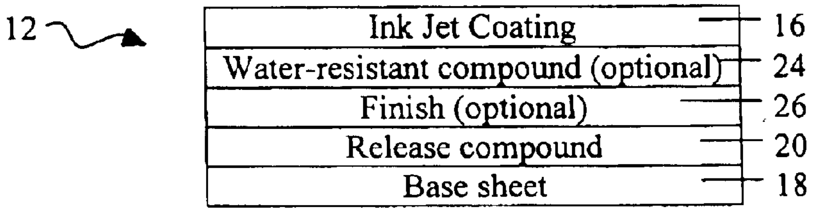
FIG. 2*a* depicts the base section of the decal kit of the present invention.
Figure 2B:
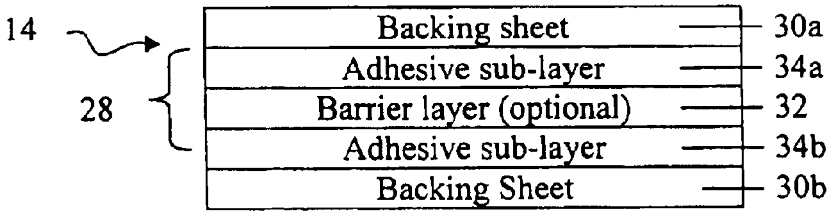
FIG. 2*b* depicts the adhesive section of the decal kit of the present invention.

Turning to FIG. 1, decal 10 of the present invention is preferably assembled using the decal kit of the present invention, which comprises base section 12 and adhesive section 14, as depicted in FIGS. 2A and 2B respectively. In a preferred embodiment of the invention, a decal image is printed onto base section 12 using a computer printer, the ink is bound within ink jet coating 16, and base section 12 and adhesive section 14 are assembled to form decal 10, as depicted in FIG. 1.

Returning to FIG. 2A, base section 12 preferably comprises a base sheet 18, coated with release compound 20, which is covered by ink jet coating 16. Base section 12 is preferably the size of a standard sized paper, such as 8½ inches by 11 inches or A4 paper, to enable base section 12 to be easily loaded into a computer printer. Release compound 20 may be any wet or dry release compound now known or later developed in the art. Further, base sheet 18 and release compound 20 may be provided separately, or as a prefabricated wet or dry release sheet. In the preferred embodiment, release compound 20 is a dry release compound, such as silicone, and base sheet 18 is any sheet capable of receiving the dry release compound, such as paper, polyester, or polypropylene. More preferably, base sheet 18 and release compound 20 are a prefabricated dry release paper, for example, the dry release paper sold by Enterprise Coated Products, Inc., although any dry release paper now known, or later developed in the art may be used consistent with the present invention.

In an alternate embodiment, base sheet 18 is a porous paper and release compound 20 is a water soluble compound, such that when water is applied to base sheet 18, release compound 20 dissolves, allowing removal of base sheet 18. Again, base sheet 18 and release compound 20 may be obtained separately or as a prefabricated wet release sheet. The water slide transfer paper sold under the trade name Trucal by Tullis Russell can be used to provide base sheet 18 and release compound 20 of the present invention.

Release compound 20 is covered by ink jet coating 16, which enables a decal image to be printed onto base section 12 using a computer printer of a home computer, preferably an ink jet printer. Preferably ink jet coating 16 is compatible with a wide variety of inks and dyes and binds the inks or dyes within ink jet coating 16. It should be understood that, when used herein, the term "ink" includes inks, dyes and any other pigments usable in computer printers now or in the future. It should further be understood that, when used herein, the term "bind" means to bind, hold and/or encapsulate ink, so that the ink will be retained within the ink jet coating, even upon exposure to moisture. As a result of the use of ink jet coating 16, which binds the ink, decal 10 of the present invention can be used with a wide variety of inks on a wide variety of substrates. Although ink jet coating 16 may be any coating that binds ink, now know or hereafter developed, preferably ink jet coating 16 is selected from the group consisting of polyurethane, vinyl acetate, polyvinyl pyrrolidone (PVP) and polyvinyl alcohol (PVOH), more preferably ink jet coating 16 comprises one or more materials selected from the group consisting of polyurethane, vinyl acetate, polyvinyl pyrrolidone (PVP) and polyvinyl alcohol (PVOH), most preferably polyurethane. Preferably, ink jet coating contains one or more of such materials cross-linked with boric acid. Ink jet coating 16 may be applied to base section 12 by any means known in the art or later developed. In an alternative embodiment, ink jet coating 16 may be substituted with a coating that does not bind inks, wherein the decal image is applied to base section 12 simply by drawing, coloring, or otherwise applying an image onto the coating.

In a preferred embodiment, base section 12 further comprises water-resistant compound 24 between ink jet coating 16 and release compound 20. Water-resistant compound 24 protects ink jet coating 16, and any ink imprinted therein, from the environment once base sheet 18 and release compound 20 are removed. Water-resistant compound 24 is preferably a non-solvent-based compound, more preferably a non-solvent-based polymer. Alternatively, a solvent-based water-resistant compound 24 may be used. However, non-solvent-based water-resistant compound 24 will not dry as quickly as a solvent-based water-resistant compound 24, and thus can be applied to base section 12 using a wide variety of manufacturing techniques. When a shiny appearance is desired water-resistant compound 24 is preferably a urethane, which will provide decal 10 with a shiny appearance.

In an alternative embodiment of the present invention, base section 12 additionally comprises a finish 26 between release compound 20 and water-resistant compound 24. Without finish 26, water-resistant compound 24 may give decal 10 a shiny appearance. Finish 26 may be any compound that will modify the appearance of decal 10. Preferably finish 26 is a varnish. In addition, finish 26 may contain color or texture, such as glitter, to further alter the appearance of decal 10, as will be readily appreciated by one in the art. When decal 10 is to be used as a tattoo, finish 26 is preferably comprised of a matte finish, to produce a tattoo with a matte appearance.

In one embodiment, a single layer provides both water resistance and a finish, such that water resistant compound 24 and finish 26 are combined in a single layer. In such embodiment, combined water resistant compound 24 and finish 26 preferably comprises a water-resistant material that produces a desired finish. In a preferred embodiment, the combined layer provides a matte finish and is preferably made of an acrylic polymer, more preferably a medium viscosity acrylic polymer. The acrylic polymer sold under the name Matte Permanent Varnish/Flexible Surface by Liquitex, may be used in such embodiment, consistent with the present invention.

Turning to FIG. 2B, adhesive section 14 of the decal kit of the present invention preferably comprises adhesive layer 28, sandwiched between first and second backing sheets 30*a* and 30*b*. Adhesive layer 28 may be any adhesive known in the art or later developed, preferably a pressure sensitive adhesive, more preferably an FDA-approved pressure sensitive adhesive. Adhesive layer 28 is preferably a hot-melt, solvent-based, or water-based adhesive, most preferably a hot-melt adhesive. Backing sheets 30*a* and 30*b* are preferably dry release sheets, and may be any dry release backing sheets known in the art or later developed. It should be understood that backing sheets 30*a* and 30*b* may be comprised of the same dry release compound and sheet as base sheet 18 and release compound 20, or may be comprised of a different dry release compound and sheet, and may themselves be comprised of different materials from each other.

In a preferred embodiment, adhesive layer 28 comprises a barrier layer 32 sandwiched between first and second adhesive sub-layers 34*a* and 34*b*. Barrier layer 32 is preferably a sheet material, more preferably foil. Most preferably barrier layer 32 is a water-resistant sheet material which provides an extra barrier between decal 10 and the substrate. In such case, barrier layer 32 aids in preventing the ink of decal 10 from coming into contact with the substrate. In addition, when the substrate is human skin or another substrate that may perspire or cause water condensation, barrier layer 32 prevents moisture from the substrate from penetrating ink jet coating 22 and marring the ink of decal 10. However, barrier layer 32 may be comprised of any material, including decorative materials, that can be maintained in place between adhesive sub-layers 34*a* and 34*b*. In one preferred embodiment, barrier layer 32 is a foil layer, which provides a foil background for the decal image of decal 10.

The decal kit of the present invention may also comprise ink or dyes to be used in the computer printer to print the decal image onto base section 12. Although any inks or dyes compatible with the user's printer can be used consistent with the present invention.

To assemble decal 10 using the decal kit of the present invention, base section 12 is fed into a computer printer, such that a decal image, or a plurality of decal images, is/are imprinted onto ink jet coating 16, which binds the ink within ink jet coating 16. The user can select whatever image he or she desires with computer software capable of creating the image. A first backing sheet 30*a* is removed from adhesive section 14, and the exposed first surface of adhesive layer 28 is affixed to ink jet coating 16 to form the assembled decal 10 of the present invention, as depicted in FIG. 1. As shown in FIG. 1, assembled decal 10 comprises base sheet 18, coated with release compound 20. Ink jet coating 16 covers release compound 20, and ink making up the decal image is bound within ink jet coating 16. Optionally, layers of water-resistant compound 24 and/or finish 26 are located between release compound 20 and ink jet coating 16. The first surface of adhesive layer 28 is adhered to ink jet coating 16. The second surface of adhesive layer 28 is protected with backing sheet 30*b*. If decal 10 does not include a barrier layer 32, decal 10, excluding backing sheet 30*b* and base sheet 18, preferably has a thickness, t, less than or equal to about $1.5\times10^{-3}$ inches. Preferably, thickness, t, is between about $1\times10^{-3}$ and $1.5\times10^{-3}$ inches. In the preferred embodiment depicted in FIG. 1, adhesive layer 28 comprises barrier layer 32 sandwiched between first and second adhesive sub-layers 34*a* and 34*b*. Depending on the identity of barrier layer 32, decal 10 may have a thickness, t, of less than or equal to about $1.5\times10^{-3}$ inches in such embodiment.

If desired, after printing the decal image onto base section 12, the user may cut around the decal image to obtain a small section of base section 12 bearing the decal image. A similarly sized piece may be cut from adhesive section 14 before affixing adhesive layer 28 to base section 12. Alternatively, the user may cut around the decal image after affixing adhesive layer 28 to base section 12.

Figure 3:
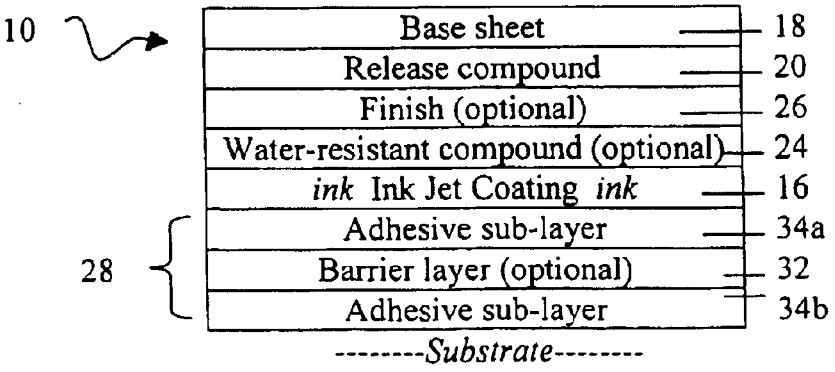
FIG. 3 depicts the decal of the present invention applied to a substrate.

To apply decal 10 to a substrate, the user removes second backing sheet 30*b* to expose the second surface of adhesive layer 28. The second surface of adhesive layer 28 is then applied to the substrate, thereby affixing decal 10 to the substrate, as depicted in FIG. 3.

Base sheet 18 is then removed to reveal the decal image. In the embodiment wherein release compound 20 is a dry release compound, base sheet 18 is simply peeled away from the remainder of decal 10. In the embodiment wherein release compound 20 is a water-soluble compound, and base sheet 18 is porous paper, water is applied to base sheet 18. As the water penetrates base sheet 18 it dissolves release compound 20, allowing base sheet 18 to be removed.

Figure 4:
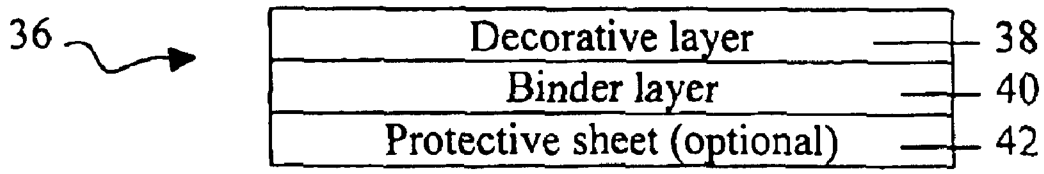
FIG. 4 depicts the decorative section of the decal kit of the present invention.

The decal kit of the present invention may additionally comprise a decorative section 36 as shown in FIG. 4. Decorative section 36 preferably comprises decorative layer 38 and binder layer 40. Decorative layer 38 may comprise any decorative material that can be adhered to a substrate via an adhesive. Preferably, decorative layer 38 comprises small particles, preferably particles selected from the group consisting of rocks, sand, glass particles and plastic particles, more preferably glass or plastic particles, and most preferably glass or plastic beads. By way of example, craft beads, glitter and similar materials could be used consistent with the present invention. In one embodiment, decorative layer 38 comprises translucent glass or plastic beads. In such embodiment, when decorative section 36 is applied to a substrate, the substrate can be seen through decorative section 36, although the appearance of the substrate is altered by the particles comprising decorative layer 38. In an alternative embodiment, decorative layer 38 comprises colored particles, preferably arranged in a pattern. The particles are preferably small. For particles that are substantially round, the diameter of the particles is preferably less than about $9\times10^{-2}$ inches, more preferably less than about $6\times10^{-2}$ inches, most preferably less than about $3\times10^{-2}$ inches. For particles that are not round, the distance between any two points on any particle is preferably less than about $9\times10^{-2}$ inches, more preferably less than about $6\times10^{-2}$ inches, most preferably less than about $3\times10^{-2}$ inches Decorative layer 38 is affixed to binder layer 40. Preferably, binder layer 40 comprises an adhesive, preferably a pressure sensitive or heat sensitive adhesive, most preferably a pressure sensitive or heat sensitive adhesive comprised of a hot-melt adhesive. However, binder layer 40 may be comprised of any material capable of binding decorative layer 38 to a substrate. In the embodiment wherein binder layer 40 is a pressure sensitive adhesive, binder layer 40 may be comprised of a double sided pressure sensitive adhesive sheet, such as those sold under the name Peel and Stick by Thermo Web. When binder layer 40 comprises a double-sided pressure sensitive adhesive, the surface of binder layer 40 opposite decorative layer 38 preferably is protected with protective sheet 42. Protective sheet 42 is preferably a dry release sheet, as described with respect to backing sheets 30*a* and 30*b*.

To make decorative section 36, decorative layer 38 is affixed to binder layer 40. In the embodiment wherein binder layer 40 is comprised of a pressure sensitive adhesive, decorative layer 38 is simply pressed against binder layer 40. In the embodiment wherein decorative layer 38 is comprised of particles, the particles are affixed to binder layer 40 to form decorative layer 38. In the embodiment wherein binder layer 40 is comprised of a heat sensitive adhesive, heat must be applied to affix decorative layer 38 to binder layer 40. In the preferred embodiment wherein decorative layer 38 is comprised of particles, the particles are arranged in a pattern on a rigid surface, one surface of binder layer 40 is placed against the particles, and heat is applied to the opposite surface of binder layer 40 to activate the adhesive and bind the particles of decorative layer 38 to binder layer 40.

Decorative section 36 may be provided as part of the decal kit of the present invention or may be provided to users as a separate product which can be applied to a variety of substrates. When decorative section 36 is a component of the decal kit, decorative section 36 is preferably applied to the exposed surface of base section 12 after removal of base sheet 18. In such embodiment, release compound 20 is preferably a dry release compound, and binder layer 40 is preferably a pressure sensitive adhesive, protected by protective layer 42. In such embodiment, preferably before decal 10 is affixed to a substrate, base sheet 18 is removed from base section 12, protective layer 42 is removed from binder layer 40, and binder layer 40 is affixed to the exposed surface of decal 10.

If decorative section 36 is provided to the user as a separate product, the user may affix decorative section 36 to a substrate using binder layer 40. In the embodiment wherein binder layer 40 is a pressure sensitive adhesive, decorative layer 36 may be applied to the substrate by removing protective layer 42 and affixing the exposed surface of binder layer 40 to the substrate. In the embodiment wherein binder layer 40 is a heat sensitive adhesive, the substrate is preferably a thin material, such as fabric. The surface of binder layer 40 opposite decorative layer 38 is applied to one surface of the substrate and heat, such as that provided by a clothes iron, is applied to the opposite surface of the substrate to activate binder layer 40 and affix decorative section 36 to the substrate.

In addition, decorative section 36 may itself be provided as a kit, wherein binder layer 40 and decorative layer 38 are provided as two separate elements of the kit. In such embodiment, decorative layer 38 may be provided not as a layer at all, but as components for the user to affix to binder layer 40, preferably as glass or plastic particles. In such an embodiment, the user affixes the components of decorative layer 38 to binder layer 40 in a pattern of the user's choosing. In the embodiment wherein binder layer 40 is a hot-melt adhesive, the user preferably arranges the components of decorative layer 38 on a surface, or in a receptacle, such as a pan. The user then places one surface of binder layer 40 on the components of decorative layer 38, and applies heat to the opposite surface of binder layer 40, such as by an iron, to activate binder layer 40 and affix decorative layer 38 to binder layer 40. In the embodiment wherein binder layer 40 is a pressure sensitive adhesive, binder layer 40 is preferably provided in a form similar to that of adhesive section 14 of the decal kit, as shown in FIG. 2*b*.

The layers of decal 10 are described herein in their preferred relationship. However, it should be understood that the terms "cover" and "over" as used herein are not limited to directly covering or being located directly over, unless otherwise specified. Thus, additional layers may be added, or layers may be combined, without detracting from the present invention.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A decal kit for use in assembling a decal, the decal kit comprising:

a base section, wherein said base section comprises:

a base sheet;

a release compound coating said base sheet;

a layer of ink jet coating covering said release compound, wherein said ink jet coating is able to bind an ink printed by a computer printer; and a layer of finish between said release compound and said layer of ink jet coating; and an adhesive section, wherein said adhesive section comprises:

first and second backing sheets; and an adhesive layer between said first and second backing sheets, wherein said first and second backing sheets are configured to be removable from said adhesive layer.

2. The decal kit of claim 1, wherein said base section further comprises a layer of a water-resistant compound between said release compound and said layer of ink jet coating.

3. The decal kit of claim 2, wherein said water-resistant compound is urethane.

4. The decal kit of claim 1, wherein said adhesive layer is comprised of first and second adhesive sub-layers, and wherein said adhesive section further comprises a barrier layer positioned between said first and second adhesive sub-layers.

5. The decal kit of claim 4, wherein said barrier layer is opaque.

6. The decal kit of claim 4, wherein said barrier layer is comprised of foil.

7. The decal kit of claim 2, wherein the combined thickness of said base section and said adhesive section, excluding the thickness of said base sheet and said backing sheets, is less than or equal to about $1.5\times10^{-3}$ inch.

8. The decal kit of claim 1, further comprising a decorative section, wherein said decorative section comprises:

a decorative layer; and a binder layer affixed to said decorative layer.

9. The decal kit of claim 8, wherein said decorative layer is comprised of a plurality of particles selected from the group consisting of rocks, sand, plastic particles and glass particles.

10. A decal comprising:

a base sheet;

a release compound coating said base sheet;

a layer of ink jet coating covering said release compound;

a layer of finish between said release compound and said layer of ink jet coating;

an image comprised of ink wherein said ink is bound within said ink jet coating;

an adhesive layer; and a backing sheet, wherein said adhesive layer is positioned between said layer of ink jet coating and said backing sheet, and wherein said backing sheet is configured to be removable from said decal.

11. The decal of claim 10, wherein the thickness of said decal, excluding the thickness of said base sheet and said backing sheet, is less than or equal to about $1.5\times10^{-3}$ inch.

12. The decal of claim 10, further comprising a layer of a water-resistant compound between said release compound and said layer of ink jet coating.

13. The decal of claim 12, wherein said water-resistant compound is urethane.

14. The decal of claim 10, wherein said adhesive layer is comprised of first and second adhesive sub-layers, and said decal further comprises a barrier layer positioned between said first and second adhesive sub-layers.

15. The decal of claim 14, wherein said barrier layer is opaque.

16. The decal of claim 14, wherein said barrier layer is comprised of foil.

17. A decal kit for use in assembling a decal, the decal kit comprising:

a base section, wherein said base section comprises:

a base sheet;

a release compound coating said base sheet;

a coating covering said release compound; and a layer of finish between said release compound and said coating; and an adhesive section, wherein said adhesive section comprises:

first and second backing sheets;

an adhesive layer between said first and second backing sheets, wherein said adhesive layer is comprised of first and second adhesive sub-layers, and a barrier layer positioned between said first and second adhesive sub-layers.

18. The decal kit of claim 17, wherein said barrier layer is opaque.

19. The decal kit of claim 18, wherein said barrier layer is comprised of foil.

20. A decal kit for use in assembling a decal, the decal kit comprising:

a base section, wherein said base section comprises:

a base sheet;

a release compound coating said base sheet; and a layer of ink jet coating covering said release compound, wherein said ink jet coating is able to bind an ink printed by a computer printer;

an adhesive section, wherein said adhesive section comprises:

first and second backing sheets; and an adhesive layer between said first and second backing sheets, wherein said first and second backing sheets are configured to be removable from said adhesive layer; and a decorative section, wherein said decorative section comprises:

a decorative layer, wherein said decorative layer is comprised of a plurality of particles selected from the group consisting of rocks, sand, plastic particles and glass particles; and a binder layer affixed to said decorative layer.

21. The decal kit of claim 1, wherein said finish layer comprises a water-resistant compound in addition to finish.

22. The decal kit of claim 10, wherein said finish layer comprises a water-resistant compound in addition to finish.

23. The decal kit of claim 1, wherein said layer of finish produces a matte finish.

24. The decal kit of claim 10, wherein said layer of finish produces a matte finish.

25. The decal kit of claim 1, wherein said layer of finish comprises a color, a texture or a combination thereof.

* * * * *